United States Patent
Kagaya

(10) Patent No.: US 11,981,320 B2
(45) Date of Patent: May 14, 2024

(54) METHOD FOR CONTROLLING HYBRID VEHICLE AND HYBRID VEHICLE

(71) Applicant: NISSAN MOTOR CO., LTD., Yokohama (JP)

(72) Inventor: Takayuki Kagaya, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/034,154

(22) PCT Filed: Oct. 28, 2020

(86) PCT No.: PCT/IB2020/000880
§ 371 (c)(1),
(2) Date: Apr. 27, 2023

(87) PCT Pub. No.: WO2022/090755
PCT Pub. Date: May 5, 2022

(65) Prior Publication Data
US 2023/0391315 A1 Dec. 7, 2023

(51) Int. Cl.
*B60W 20/20* (2016.01)
*B60K 6/40* (2007.10)
(Continued)

(52) U.S. Cl.
CPC ............... *B60W 20/20* (2013.01); *B60K 6/40* (2013.01); *B60K 6/442* (2013.01); *B60W 20/15* (2016.01);
(Continued)

(58) Field of Classification Search
CPC ............... B60W 20/20; B60W 30/188; B60W 30/1882; B60W 20/15; B60K 6/44; B60K 6/442; B60L 50/16
See application file for complete search history.

(56) References Cited

U.S. PATENT DOCUMENTS

| | | | |
|---|---|---|---|
| 2012/0245783 A1* | 9/2012 | Tamagawa ............ | B60W 10/06 180/65.265 |
| 2012/0245785 A1* | 9/2012 | Tamagawa ............ | B60K 6/442 180/65.265 |

(Continued)

FOREIGN PATENT DOCUMENTS

| | | | |
|---|---|---|---|
| CN | 104903133 A | | 9/2015 |
| CN | 106853819 A | * | 6/2017 |

(Continued)

OTHER PUBLICATIONS

EPO machine translation of JP 2018-134942 A (original JP document published Aug. 30, 2018) (Year: 2018).*

*Primary Examiner* — David A Testardi
(74) *Attorney, Agent, or Firm* — Foley & Lardner LLP

(57) ABSTRACT

A method for controlling a hybrid vehicle is used for controlling a hybrid vehicle including: an engine connected to a generator and configured to be connected to a driving wheel; and a motor configured to be connected to the driving wheel, the motor being driven by electric power supplied from a battery connected to the generator. The control method including: in a direct drive mode in which the engine is connected to the driving wheel, when the battery is charged and required charging electric power per unit time exceeds a threshold value, switching, by releasing a connection state between the engine and the driving wheel and connecting the motor to the driving wheel, to a series mode in which the engine drives the generator.

5 Claims, 8 Drawing Sheets

(51) Int. Cl.
  *B60K 6/442* (2007.10)
  *B60W 20/15* (2016.01)
(52) U.S. Cl.
  CPC ............... *B60W 2510/0638* (2013.01); *B60W 2510/0657* (2013.01); *B60W 2510/244* (2013.01); *B60W 2520/10* (2013.01); *B60Y 2200/92* (2013.01)

(56) References Cited

U.S. PATENT DOCUMENTS

| | | | | |
|---|---|---|---|---|
| 2014/0136035 A1* | 5/2014 | Boskovitch | ............... | B60K 6/34 |
| | | | | 903/903 |
| 2014/0195084 A1* | 7/2014 | Ueda | ............... | B60K 6/442 |
| | | | | 180/65.265 |
| 2014/0229043 A1* | 8/2014 | Frank | ............... | B60W 10/02 |
| | | | | 180/65.23 |
| 2015/0336565 A1* | 11/2015 | Yamazaki | ............... | B60W 10/02 |
| | | | | 180/65.265 |
| 2015/0353075 A1* | 12/2015 | Futatsudera | ............... | B60W 20/00 |
| | | | | 180/65.23 |
| 2016/0031341 A1* | 2/2016 | Komatsu | ............... | B60L 15/007 |
| | | | | 307/10.1 |
| 2016/0257299 A1* | 9/2016 | Ikedaya | ............... | B60K 6/387 |
| 2016/0264124 A1* | 9/2016 | Hotta | ............... | B60W 50/0097 |
| 2017/0021714 A1* | 1/2017 | Niimi | ............... | B60W 20/20 |
| 2018/0141426 A1* | 5/2018 | Tsukizaki | ............... | B60W 10/06 |
| 2018/0201116 A1* | 7/2018 | Miyagawa | ............... | B60K 6/547 |
| 2018/0354492 A1* | 12/2018 | Meyer | ............... | B60W 10/26 |
| 2019/0161071 A1* | 5/2019 | Hamann | ............... | B60W 50/16 |
| 2019/0299972 A1* | 10/2019 | Honjo | ............... | B60W 40/13 |
| 2020/0070805 A1* | 3/2020 | Maeda | ............... | B60W 10/26 |
| 2022/0274477 A1* | 9/2022 | Tsukizaki | ............... | B60L 50/16 |
| 2023/0249668 A1* | 8/2023 | Li | ............... | B60W 10/08 |
| | | | | 701/22 |
| 2023/0392654 A1* | 12/2023 | Koga | ............... | F16D 48/06 |

FOREIGN PATENT DOCUMENTS

| | | | | |
|---|---|---|---|---|
| DE | 102017208654 A1 | * | 11/2018 | |
| DE | 102017208656 A1 | * | 11/2018 | ............ B60K 6/387 |
| JP | 2012-056468 A | | 3/2012 | |
| JP | 2017-056836 A | | 3/2017 | |
| JP | 2018134942 A | * | 8/2018 | |
| WO | WO-2011/074483 A1 | | 6/2011 | |
| WO | WO-2014/109063 A1 | | 7/2014 | |
| WO | WO-2015068482 A1 | * | 5/2015 | ............ B60K 26/04 |

\* cited by examiner

_US 11,981,320 B2_

METHOD FOR CONTROLLING HYBRID VEHICLE AND HYBRID VEHICLE

TECHNICAL FIELD

Technical Field

The present invention relates to a method for controlling a hybrid vehicle and a hybrid vehicle.

Background Art

In a hybrid vehicle with an engine and a motor as a driving source, the engine is further connected to a generator and used as an electric power generation source. In such a hybrid vehicle, there are two modes, that is, a direct drive mode and a series mode, depending on a connection method of the engine.

In the direct drive mode, the engine is directly connected to driving wheels, and power of the engine is directly transmitted to the driving wheels, whereby the engine is used as a driving source. In the series mode, the engine is connected to the generator, and the motor supplied with electric power generated by the generator is used as a driving source.

WO2011/074483 discloses an example of a method for selecting a direct drive mode and a series mode in such a hybrid vehicle. According to WO2011/074483, when the direct drive mode is selected and required output required for traveling and charging exceeds a sum of output of the motor and output of the engine, the mode is switched to the series mode.

SUMMARY OF INVENTION

In a direct drive mode in which an engine is connected to driving wheels, a part of a driving force is used for traveling of a vehicle, and thus electric power generation is not actively performed. However, even in the direct drive mode, by making output of the engine larger than output required for traveling, electric power generation can be performed by using surplus output.

As in a technique disclosed in WO2011/074483, even when the direct drive mode is selected according to a predetermined condition, it may be necessary to obtain electric power equal to or greater than the surplus output in order to increase a charging amount of a battery in a short time. However, in the direct drive mode, a rotation speed of the engine is determined according to a vehicle speed, for example, when high-speed charging is required, it is necessary to increase a torque in order to increase required charging electric power per unit time. However, if the torque is increased while the rotation speed is kept constant, an operation efficiency of the engine deteriorates.

The invention has been made in view of such a problem, and an object of the invention is to implement operation control of a hybrid vehicle capable of suppressing deterioration of a fuel consumption amount in an entire vehicle even under a condition in which a direct drive mode is selected.

According to one aspect of the present invention, a method for controlling a hybrid vehicle is used for controlling a hybrid vehicle including: an engine connected to a generator and configured to be connected to a driving wheel; and a motor configured to be connected to the driving wheel, the motor being driven by electric power supplied from a battery connected to the generator. The control method including: in a direct drive mode in which the engine is connected to the driving wheel, when the battery is charged and required charging electric power per unit time exceeds a threshold value, switching, by releasing a connection state between the engine and the driving wheel and connecting the motor to the driving wheel, to a series mode in which the engine drives the generator.

DESCRIPTION OF EMBODIMENTS

Hereinafter, an embodiment of the invention will be described with reference to the accompanying drawings.

Figure 1:
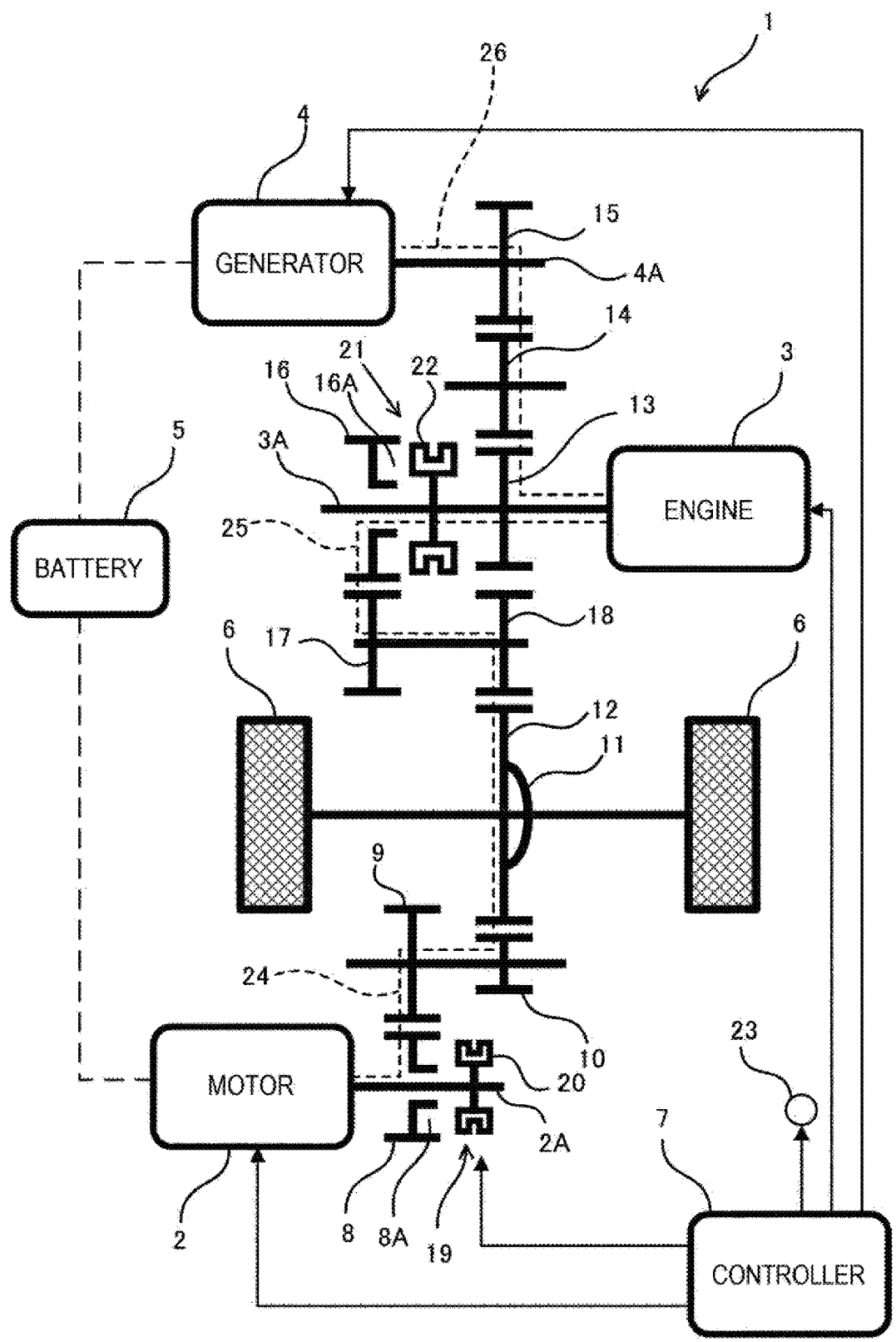
FIG. 1 is a schematic configuration diagram of a hybrid vehicle according to the present embodiment.

FIG. 1 is a schematic configuration diagram of a vehicle 1. The vehicle 1 includes an engine 3, a generator 4, a battery 5, a motor 2, and a controller 7.

The engine 3 is an internal combustion engine, and is, for example, a gasoline engine or a diesel engine.

The generator 4 is a motor generator mainly used for electric power generation, and can perform electric power generation and power running. In detail, the generator 4 is driven by power of the engine 3 to perform electric power generation, and can assist a driving force of the engine 3 in addition to motoring of the engine 3 by performing power running using electric power of the battery 5, which will be described later.

The battery 5 is charged with electric power generated by the generator 4 and electric power regenerated by the motor 2, which will be described later.

The motor 2 is a motor generator mainly used for traveling. The motor 2 is driven by the electric power of the battery 5 to drive driving wheels 6, and co-rotates with rotation of the driving wheels 6 to generate electric power by deceleration energy during deceleration or the like.

The controller 7 controls the motor 2, the engine 3, and the generator 4.

The controller 7 is implemented by a microcomputer including a central processing unit (CPU), a read-only memory (ROM), a random access memory (RAM), and an input/output interface (I/O interface). The controller 7 may be implemented by a plurality of microcomputers.

The vehicle 1 includes a power transmission path 24 that transmits power between the motor 2 and the driving wheels 6, a power transmission path 25 that transmits power between the engine 3 and the driving wheels 6, and a power transmission path 26 that transmits power between the engine 3 and the generator 4.

The power transmission path 24 includes a first reduction gear 8 provided on a rotation shaft 2A of the motor 2, a second reduction gear 9 meshing with the first reduction gear 8, a differential gear 12 provided on a differential case 11, and a third reduction gear 10 provided coaxially with the second reduction gear 9 and meshing with the differential gear 12. The power transmission path 24 is provided with a first clutch mechanism 19 that switches between a state in which the first reduction gear 8 is rotatable relative to the rotation shaft 2A and a state in which the first reduction gear 8 is not rotatable relative to the rotation shaft 2A. The first clutch mechanism 19 is a so-called dog clutch that includes a first sleeve 20 axially slidably supported by the rotation shaft 2A, and an engagement portion 8A provided on the first reduction gear 8. That is, the first sleeve 20 moves toward the first reduction gear 8, and a plurality of convex portions provided on the first sleeve 20 in a manner of protruding toward the engagement portion 8A and a plurality of convex portions provided on the engagement portion 8A in a manner of protruding toward the first sleeve 20 mesh with each other so as to be alternately arranged in a rotation direction, whereby the first sleeve 20 and the engagement portion 8A are brought into an engaged state. From this state, the first sleeve 20 moves in a direction opposite to the first reduction gear 8, and the engagement between the convex portions of the first sleeve 20 and the engagement portion 8A is released, whereby the first sleeve 20 and the engagement portion 8A are brought into a disengaged state. Movement of the first sleeve 20 is performed by an electric actuator.

When the first clutch mechanism 19 is in the engaged state, power of the motor 2 is transmitted to the driving wheels 6. On the other hand, when the first clutch mechanism 19 is in the disengaged state, rotation of the rotation shaft 2A of the motor 2 is not transmitted to the first reduction gear 8, and thus transmission of power from the motor 2 to the driving wheels 6 is blocked.

The power transmission path 25 includes a fourth reduction gear 16 provided on an output shaft 3A of the engine 3, a fifth reduction gear 17 meshing with the fourth reduction gear 16, the differential gear 12 provided on the differential case 11, and a sixth reduction gear 18 provided coaxially with the fifth reduction gear 17 and meshing with the differential gear 12. The power transmission path 25 is provided with a second clutch mechanism 21 that switches between a state in which the fourth reduction gear 16 is rotatable relative to the output shaft 3A and a state in which the fourth reduction gear 16 is not rotatable relative to the output shaft 3A. The second clutch mechanism 21 is a so-called dog clutch that includes a second sleeve 22 axially slidably supported by the output shaft 3A, and an engagement portion 16A provided on the fourth reduction gear 16. That is, the second sleeve 22 moves toward the fourth reduction gear 16, and a plurality of convex portions provided on the second sleeve 22 in a manner of protruding toward the engagement portion 16A and a plurality of convex portions provided on the engagement portion 16A in a manner of protruding toward the second sleeve 22 mesh with each other so as to be alternately arranged in a rotation direction, whereby the second sleeve 22 and the engagement portion 16A are brought into an engaged state. From this state, the second sleeve 22 moves in a direction opposite to the fourth reduction gear 16, and the engagement between the convex portions of the second sleeve 22 and the engagement portion 16A is released, whereby the second sleeve 22 and the engagement portion 16A are brought into a disengaged state. Movement of the second sleeve 22 is performed by an electric actuator.

When the second clutch mechanism 21 is in the engaged state, the power of the engine 3 is transmitted to the driving wheels 6. This state is referred to as a direct drive mode because the engine 3 is directly connected to the driving wheels 6 to cause the driving wheels 6 to operate. On the other hand, when the second clutch mechanism 21 is in the disengaged state, rotation of the output shaft 3A of the engine 3 is not transmitted to the fourth reduction gear 16, and thus transmission of power from the engine 3 to the driving wheels 6 is blocked.

The power transmission path 26 includes a seventh reduction gear 13 provided on the output shaft 3A of the engine 3, an eighth reduction gear 14 meshing with the seventh reduction gear 13, and a ninth reduction gear 15 provided on a rotation shaft 4A of the generator 4. In this example, the power transmission path 26 does not include an element that blocks transmission of power, and the power transmission path 26 is always in a state in which power is transmitted. Therefore, in the direct drive mode, an excess of output of the engine 3 with respect to a driving force required for traveling is used for generating electric power in the generator 4.

Engagement and disengagement operations of the first clutch mechanism 19 and the second clutch mechanism 21 are controlled by the controller 7.

In the vehicle 1 having the above configuration, switching control is performed between a series mode, in which power is transmitted to the driving wheels 6 via the power transmission path 24 by connecting the engine 3 the generator 4 and the motor 2 in series, and the direct drive mode, in which power is transmitted to the driving wheels 6 via the power transmission path 25 by directly connecting the engine 3 to the driving wheels 6. The controller 7 switches between the series mode and the direct drive mode according to an operation state, specifically, according to a vehicle speed and the driving force.

Figure 2:
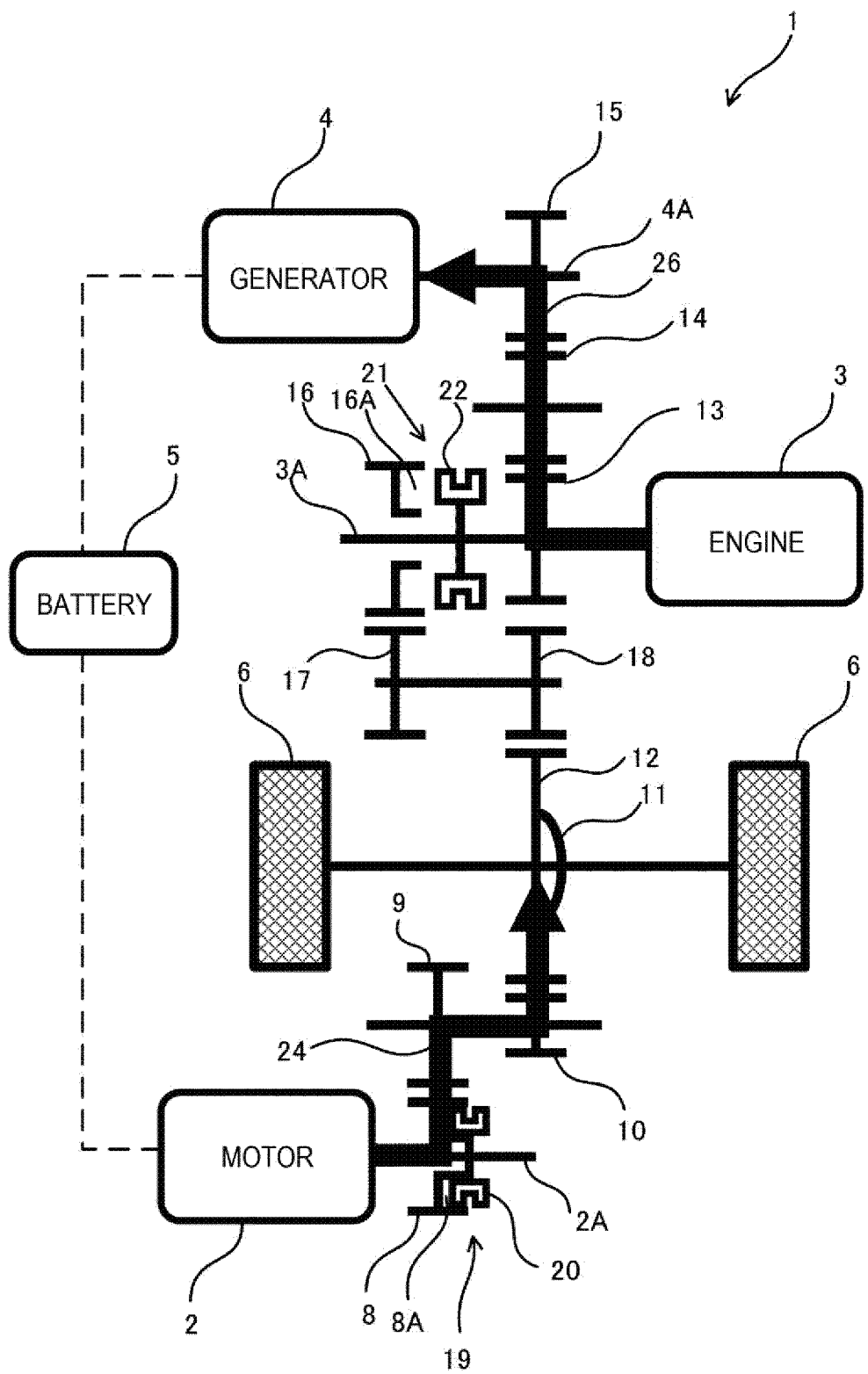
FIG. 2 is a diagram illustrating a power transmission state in a series mode.

FIG. 2 is a diagram illustrating a power transmission state in the series mode. In the series mode, power is transmitted to the driving wheels 6 through the power transmission path 24. That is, in the series mode, power generated by the motor 2 is transmitted to the driving wheels 6 by bringing the first clutch mechanism 19 into the engaged state. At this time, the second clutch mechanism 21 is in the disengaged state.

In addition, the power of the engine 3 is transmitted to the generator 4 via the power transmission path 26, the generator 4 generates electric power, and the battery 5 is charged with the generated electric power. When a charging amount of the battery 5 is larger than an upper limit value (a charging stop threshold value) and it is not necessary to further charge the battery 5, the engine 3 may be stopped.

Figure 3:
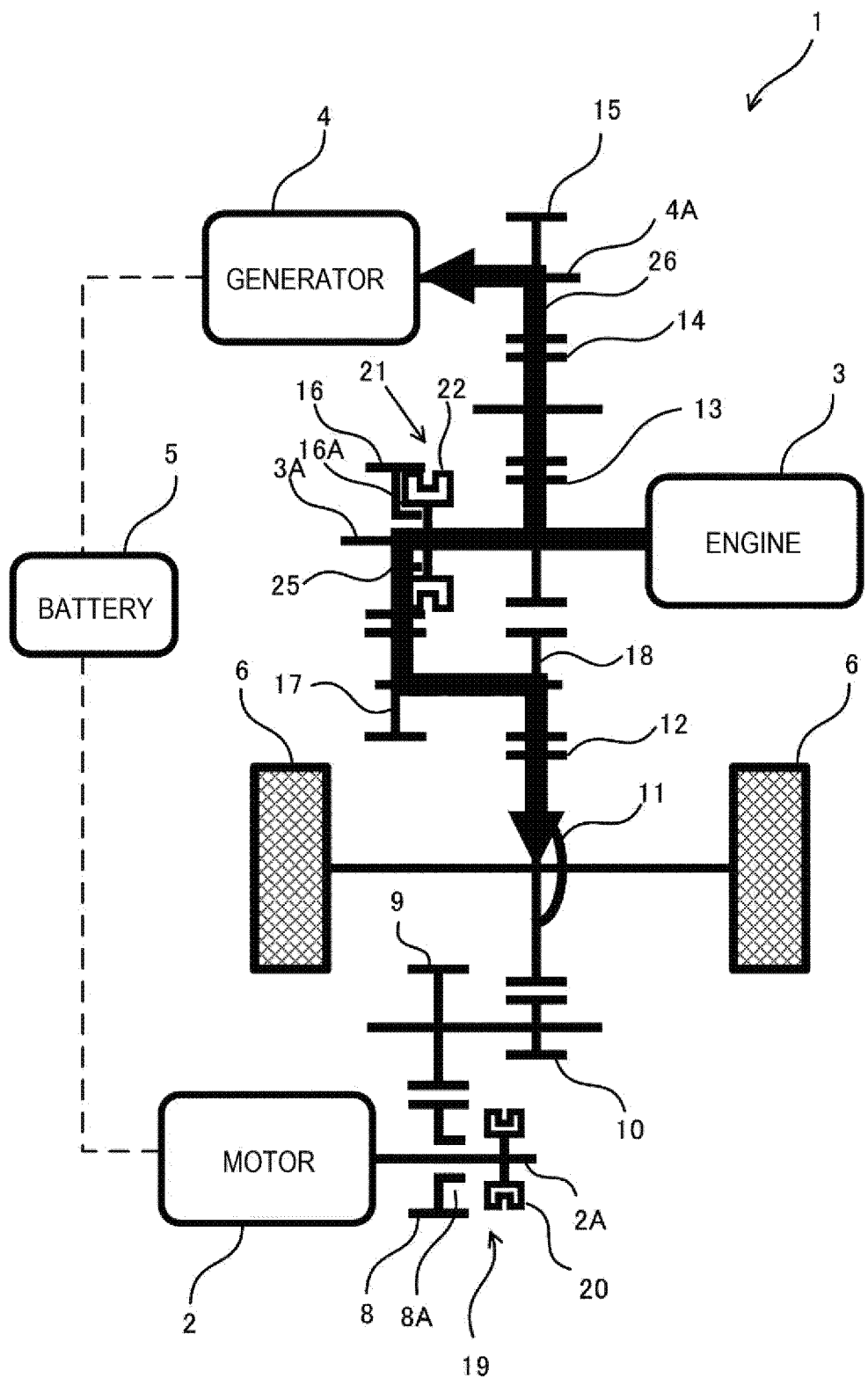
FIG. 3 is a diagram illustrating a power transmission state in a direct drive mode.

FIG. 3 is a diagram illustrating a power transmission state in the direct drive mode. In the direct drive mode, power is transmitted to the driving wheels 6 through the power transmission path 25. That is, in the direct drive mode, power generated by the engine 3 is transmitted to the driving wheels 6 by bringing the second clutch mechanism 21 into the engaged state.

In the direct drive mode, the first clutch mechanism 19 is in the disengaged state. If the first clutch mechanism 19 is brought into the engaged state in the direct drive mode, the motor 2 co-rotates with the rotation of the driving wheels 6, and an induced electromotive force is generated. When there is margin in a charging capacity of the battery 5, energy is regenerated by charging the battery 5 with the generated electric power. On the other hand, when there is no margin in the charging capacity of the battery 5, electric power generation resistance is a friction that hinders the rotation of the driving wheels 6, which causes a decrease in fuel consumption performance. Therefore, by bringing the first clutch mechanism 19 into the disengaged state in the direct drive mode, the decrease in the fuel consumption performance caused by the co-rotation of the motor 2 described above can be suppressed.

In the direct drive mode, when the output of the engine 3 is less than the output required for traveling of the vehicle 1, a driving force of the generator 4 is supplementarily transmitted to the driving wheels 6 via the power transmission path 26 and the power transmission path 25 by causing the generator 4 to perform power running. Accordingly, power required for the traveling of the vehicle 1 can be obtained.

Next, control for switching between the series mode and the direct drive mode will be described.

In general, the controller 7 selects one of the direct drive mode and the series mode based on a required driving force and a required vehicle speed of the vehicle 1 and in consideration of a fuel consumption amount of the engine 3 and the like. The selection control will be described with reference to FIG. 4.

Figure 4:
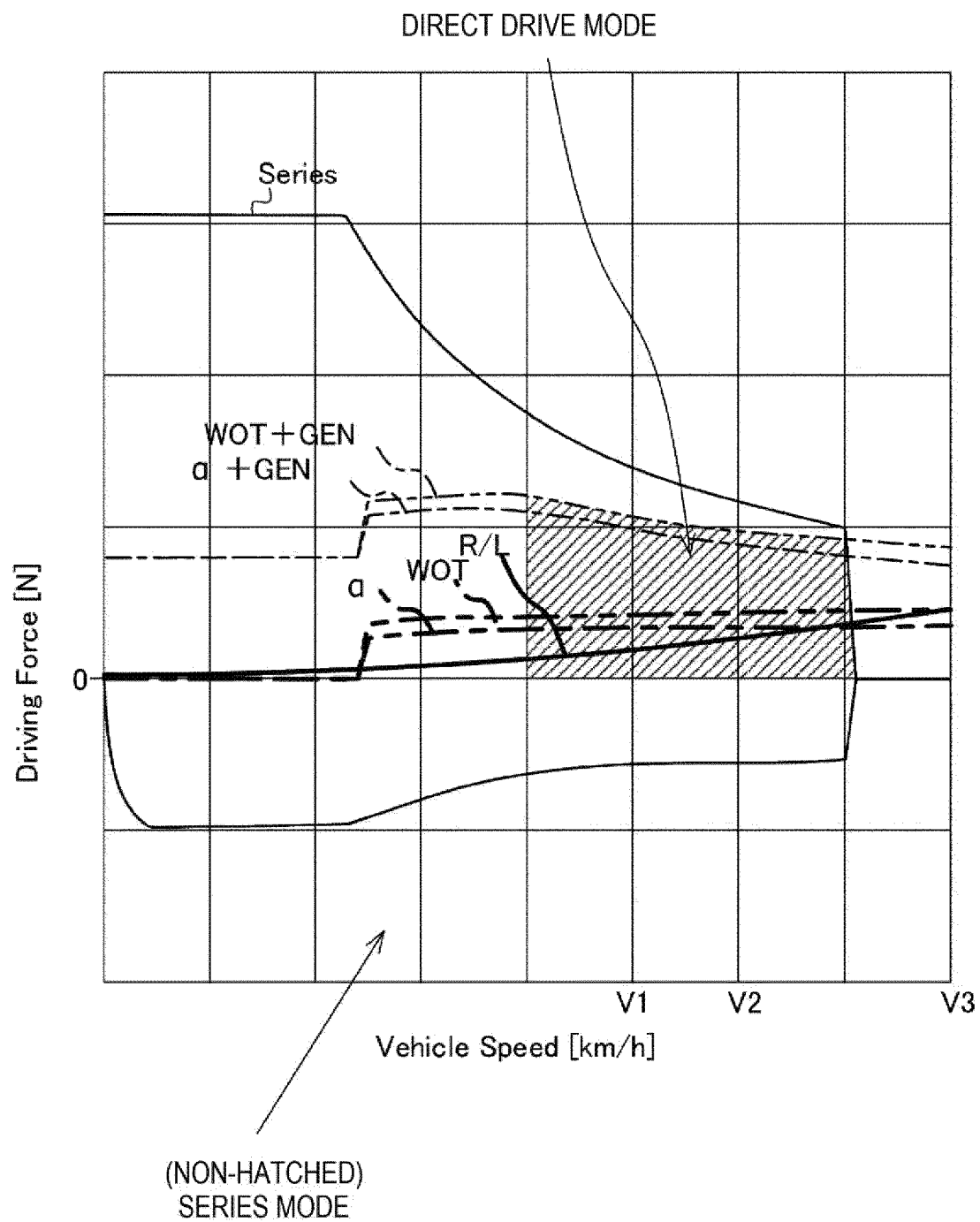
FIG. 4 is a diagram illustrating an operational view.

FIG. 4 illustrates an operational view related to the engine 3. In this figure, a horizontal axis indicates a vehicle speed (km/h), and a vertical axis indicates a driving force (N) obtained by the motor 2 and/or the engine 3. It is assumed that the direct drive mode is selected in a region hatched upward to the right. Hereinafter, characteristics indicated by various lines in the figure will be examined. Speeds V1 to V3 illustrated in the figure are used for describing a specific electric power generation amount with reference to FIG. 6, which will be described later.

Thin solid lines indicate both positive and negative driving forces obtained when the series mode is selected. When the series mode is selected, the output of the engine 3 does not directly act on the wheels 6, and thus the driving force is obtained by output of the motor 2. The driving force obtained by the motor 2 is determined by an output torque and a gear ratio of the motor 2, and a diameter of the wheel.

In the positive driving force range, the engine 2 is driven at constant high output) when the speed is relatively low (for example, about 60 km/h or less), and the output decreases as the speed increases after the speed achieves a medium speed range and a high speed range (for example, about 60 km/h to 150 km/h). It is known that an output characteristic of the motor 2 is poor in an ultrahigh speed range, and thus the output rapidly decreases and becomes zero after the speed achieves an upper limit speed (for example, about 150 km/h or more). As compared with the positive output range, the negative output range has a change characteristic similar to that of the positive output range, but an absolute value is smaller.

A thick one-dot chain line indicates an α line. The α line indicates a driving force of the vehicle 1 obtained when the engine 3 is driven with optimum fuel consumption in the direct drive mode. In the low speed range (about 60 km/h or less), an output characteristic of the engine 3 is poor, and the output becomes a value close to zero. The output rises after the speed achieves the medium speed range (about 60 km/h or more), and thereafter, the output increases as the speed increases.

A thick two-dot chain line indicates a wide open slot (WOT) line. The WOT line indicates a driving force of the vehicle 1 obtained when the engine 3 is driven at maximum output in the direct drive mode. The WOT line has a change characteristic similar to that of the α line, and indicates output larger than that of the α line as a whole.

A thin one-dot chain line is referred to as an α+GEN line. The α+GEN line indicates a driving force obtained when the generator 4 is caused to perform power running at maximum output and the engine 3 is driven with the optimum fuel consumption during the direct drive mode operation. Therefore, the driving force indicated by the α+GEN line corresponds to a sum of the maximum output of the generator 4 that performs the power assist and the output of the engine 3 driven with the optimum fuel consumption.

A thin two-dot chain line is referred to as a WOT+GEN line. The WOT+GEN line indicates a driving force obtained when the engine 3 is driven at the maximum output during the direct drive mode operation. The driving force indicated by the WOT+GEN line corresponds to a sum of the maximum output of the generator 4 that performs the power assist and the maximum output of the engine 3. Therefore, the WOT+GEN line indicates a maximum driving force that can be obtained by the driving wheels 6 in the direct drive mode.

A thick solid line is referred to as a road/load (R/L) line. The R/L line indicates a driving force required for constant speed traveling in a case in which a traveling road is flat. According to the R/L line, the driving force required for the constant speed traveling increases as the vehicle speed increases. This is because traveling resistance such as air resistance and road surface resistance increases in proportion to the vehicle speed.

Here, when the α line and the R/L line are compared with each other, the driving force indicated by the R/L line is smaller than that of the α line in the medium speed range and the high speed range. This indicates that the driving force obtained by the engine 3 driven with the optimum fuel consumption (the α line) exceeds the driving force required for the constant speed traveling (the R/L line). Here, an excess of the α line with respect to the R/L line is a driving force that is not used for the rotation of the wheels 6, and is used for generating electric power in the generator 4. Therefore, in general, even when the engine 3 is operated with the optimum fuel consumption in the direct drive mode, the battery 5 can be charged with electric power generated using the driving force corresponding to a difference obtained by subtracting the R/L line from the α line.

Figure 8:
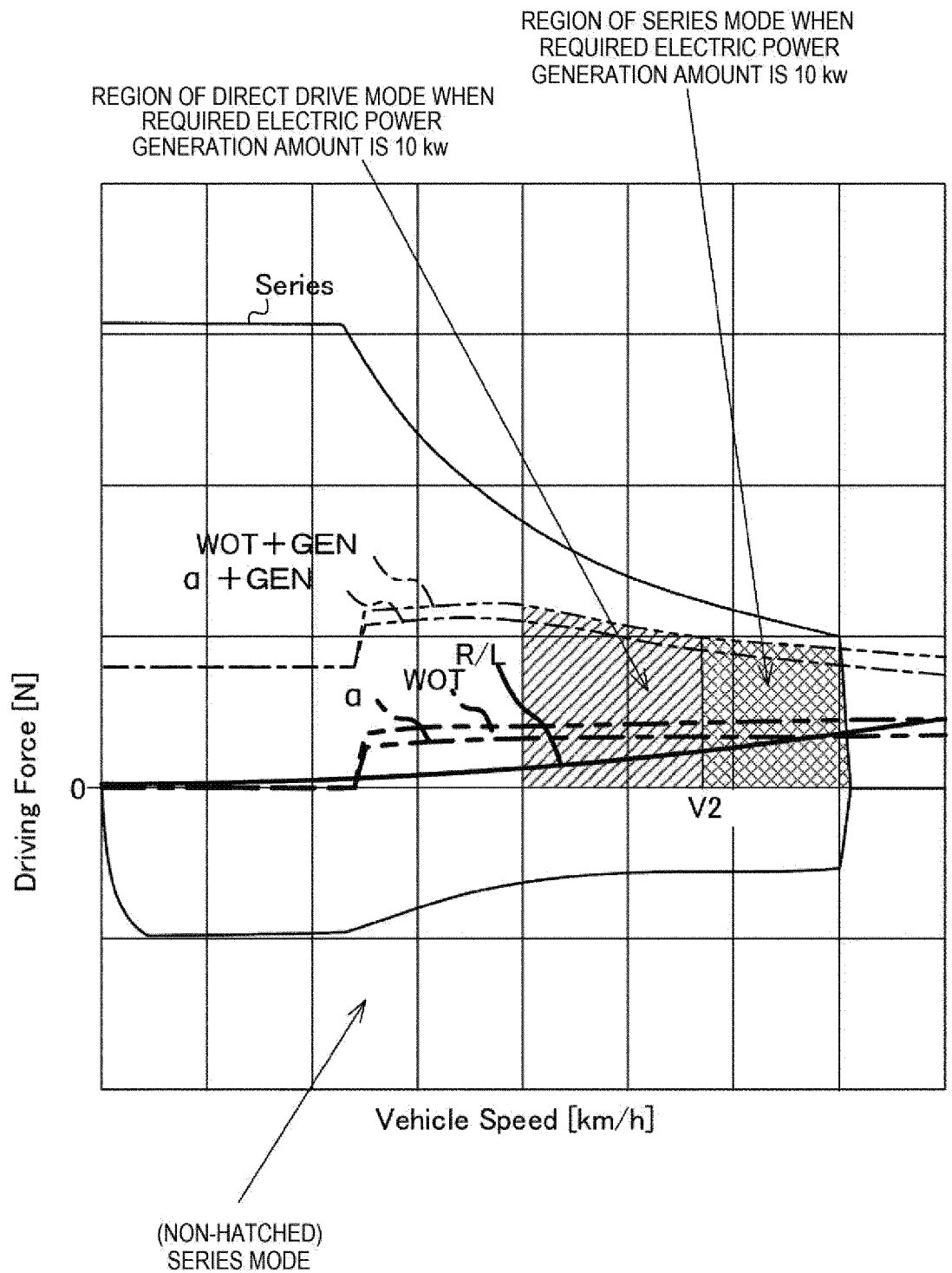
FIG. 8 is a diagram illustrating still another operational view.

Since the direct drive mode is a mode in which the driving force is obtained by the engine 3, it is desirable to select the direct drive mode in the medium speed range and the high speed range than the low speed range. The WOT+GEN line indicates upper limit output in the direct drive mode. Therefore, the direct drive mode is selected in principle in the region hatched upward to the right, that is, in a region that includes the medium speed range and the high speed range in which a driving efficiency of the engine 3 is high in the horizontal axis, and that is below the WOT+GEN line on which the maximum output can be obtained in the vertical axis. A lower limit speed in the region in which the direct drive mode is selected is mainly due to a performance of the engine 3, and is mainly determined by a design. On the other hand, in a non-hatched region, the series mode is selected in principle. As will be described later, even in the hatched region, the series mode may be selected as illustrated in FIGS. 8 and 9 according to processing illustrated in FIG. 5.

Figure 5:
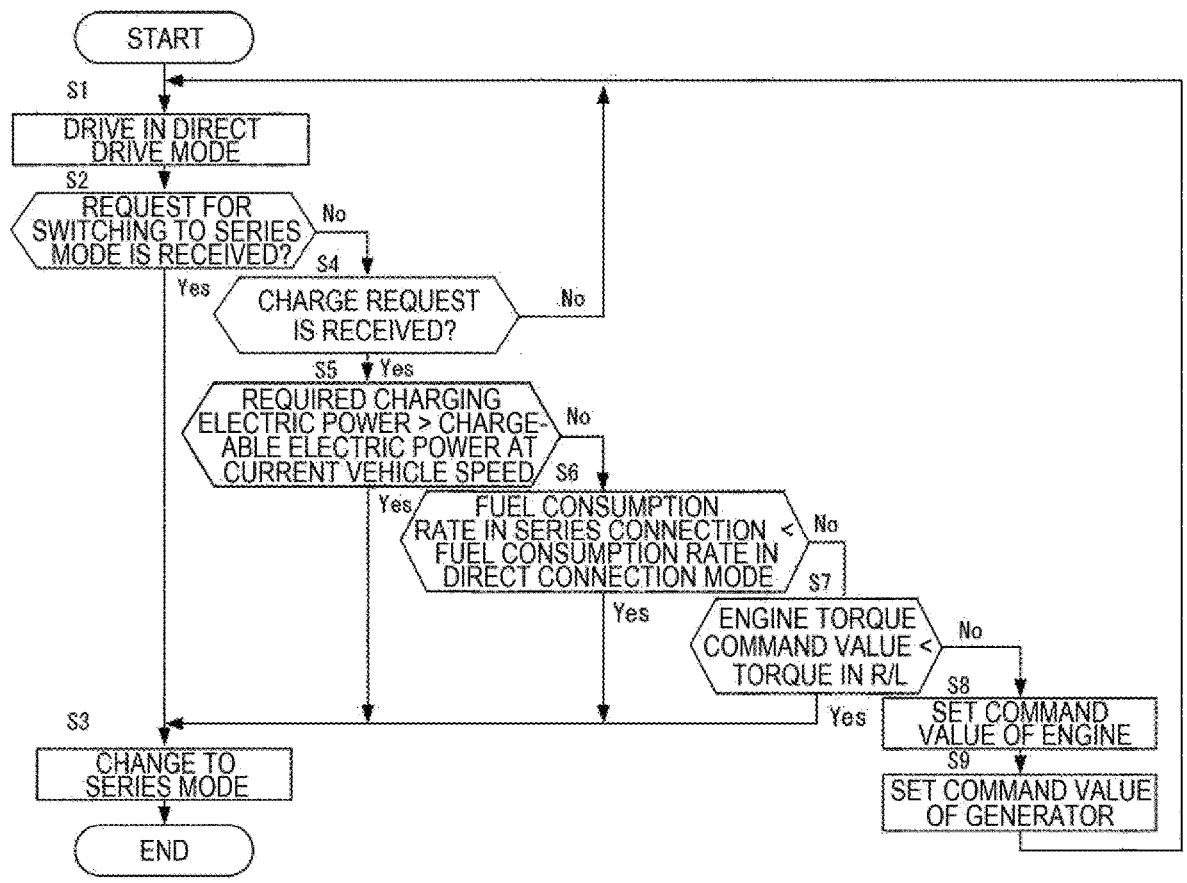
FIG. 5 is a diagram illustrating control for switching to the series mode.

FIG. 5 is a diagram illustrating the control for switching from the direct drive mode to the series mode performed by the controller 7. It is assumed that, in a previous stage where the switching control is performed, in the operational view illustrated in FIG. 4, an operating point is in the region hatched upward to the right, and the direct drive mode is selected. In the following, a description will be given of conditions under which the mode is switched to the series mode in a state in which the direct drive mode is selected as described above.

In step S1, the controller 7 determines the required driving force and the required vehicle speed of the vehicle 1 according to a detected engine rotation speed, a depression amount of an accelerator pedal, and the like. It is assumed that in this figure, the controller 7 selects the direct drive mode based on the required driving force, the required vehicle speed, and the operational view illustrated in FIG. 4.

When the series mode is selected and the charging amount of the battery 5 is less than a lower limit value (a charging start threshold value) and the motor 2 cannot be driven, the direct drive mode is set. When the charging amount of the battery 5 exceeds the upper limit value (the charging stop threshold value) and further charging is unnecessary, the series mode is set and the engine 3 is stopped.

In step S2, the controller 7 determines whether a request for switching to the series mode is received from a host controller or the like. For example, in a case in which a traveling route determined in a navigation system includes an uphill slope which requires large electric power consumption, a residential area where the engine 3 needs to be stopped for noise reduction, or the like, the charging amount of the battery 5 needs to be increased in advance, and thus the request for switching to the series mode is transmitted from the host controller.

When the controller 7 receives the request for switching to the series mode (S2: Yes), the controller 7 then performs processing of step S3. When the controller 7 does not receive the request for switching to the series mode (S2: No), the controller 7 then performs processing of step S4.

In step S3, the controller 7 selects the series mode. In the series mode, the motor 2 is connected to the driving wheels 6 by releasing the second clutch mechanism 21 and bringing the first clutch mechanism 19 into the connected state. As described above, when the request for switching to the series mode is received from the host controller or the like (S2: Yes), the series mode is always selected.

In step S4, the controller 7 determines whether a charge request requesting an increase in the charging amount of the battery 5 is received from a user. As an example, the charge request is made by a button operation based on a determination of the user when it is predicted that the electric power consumption will increase before traveling on the uphill slope.

The controller 7 then performs determination processing of step S5 when the charge request is received (S4: Yes). When the charge request is not received (S4: No), the controller 7 then performs the processing of step S1 in order to continue the operation in the direct drive mode.

In step S5, the controller 7 obtains a required charging speed (a rate of increase in the charging amount) based on a state (a current temperature, the charging amount) of the battery 5, and calculates required charging electric power per unit time required to implement the charging speed. Then, the controller 7 determines whether the required charging electric power per unit time exceeds chargeable electric power per unit time that can be implemented at a current vehicle speed. When the required charging electric power per unit time exceeds the chargeable electric power per unit time, the direct drive mode is switched to the series mode to achieve quick charging according to the charge request in order to exceed the required charging speed. In the following, the required charging electric power per unit time and the chargeable electric power per unit time are simply referred to as required charging electric power and chargeable electric power, respectively.

Referring to FIG. 4, the chargeable electric power is determined according to the difference between the WOT line and the R/L line at a certain vehicle speed. Therefore, the controller 7 obtains a driving force difference by subtracting the driving force required for the constant speed traveling of the vehicle 1 (the R/L line) from the maximum driving force of the engine 3 (the WOT line), and calculates the chargeable electric power based on the driving force difference.

Referring again to FIG. 5, when the required generated electric power is larger than the chargeable electric power (S5: Yes), the controller 7 determines that quick charging cannot be performed while maintaining the vehicle speed in the direct drive mode, and it is necessary to change the mode to the series mode, and then performs the processing of step S3. When the required charging electric power is not larger than the chargeable electric power (S5: No), the controller 7 further performs determination processing of step S6.

In step S6, the controller 7 determines whether an operation efficiency in the series mode exceeds an operation efficiency in the direct drive mode based on an assumption that the required charging electric power obtained in step S5 is implemented.

In the direct drive mode, the engine 3 is connected to the driving wheels 6, and the rotation speed is determined according to the vehicle speed, and thus it is necessary to control the output of the engine 3 by the torque. However, when it is assumed that the same required charging electric power is obtained, the operation efficiency of the engine 3 in the direct drive mode in which only the torque is changed may be less than the operation efficiency of the engine 3 in the series mode in which the rotation speed and the torque can be freely selected. Therefore, fuel consumption rates, which indicate the operation efficiencies of the engine 3 in both modes, are compared, and a mode in which the operation efficiency is high and the fuel consumption rate is small is selected.

When a fuel consumption rate in the series mode is smaller than a fuel consumption rate in the direct drive mode (the operation efficiency is high) (S6: Yes) under a condition assuming that the required charging electric power is obtained at a predetermined speed, the controller 7 then performs the processing of step S3 in order to change the mode to the series mode. When the fuel consumption rate in the series mode is not smaller than the fuel consumption rate in the direct drive mode (the operation efficiency is low) (S6: No), the controller 7 further performs determination processing of step S7. Details of the determination processing using the fuel consumption rate will be described later with reference to FIG. 6.

In step S7, the controller 7 calculates an output command value (a torque command value) for the engine 3 required for implementing the required charging electric power at a current vehicle speed when the direct drive mode is selected. Then, the controller 7 determines whether the output command value for the engine 3 exceeds the torque required for traveling indicated by the R/L line.

When the output command value for the engine 3 is smaller than the output indicated by the R/L line required for the constant speed traveling (S7: Yes), the controller 7 determines that the charging cannot be performed while maintaining the speed in the direct drive mode, and then performs the processing of step S3 in order to change the mode to the series mode. When the output command value is not smaller (larger) than the output indicated by the R/L line (S7: No), the controller 7 then performs processing of step S8 in order to operate in the direct drive mode.

In step S8, the controller 7 sets the output command value obtained in step S7 as a command value for the engine 3. Accordingly, an excess of the output of the engine 3 with respect to the output indicated by the R/L line required for traveling is used for generating electric power, and the battery 5 can be charged.

In step S9, the controller 7 sets the required generated electric power as a command value for the generator 4. As a result, the motor 2 co-rotates with the driving wheels 6, and thus electric power corresponding to the required generated electric power can be generated.

Figure 6:
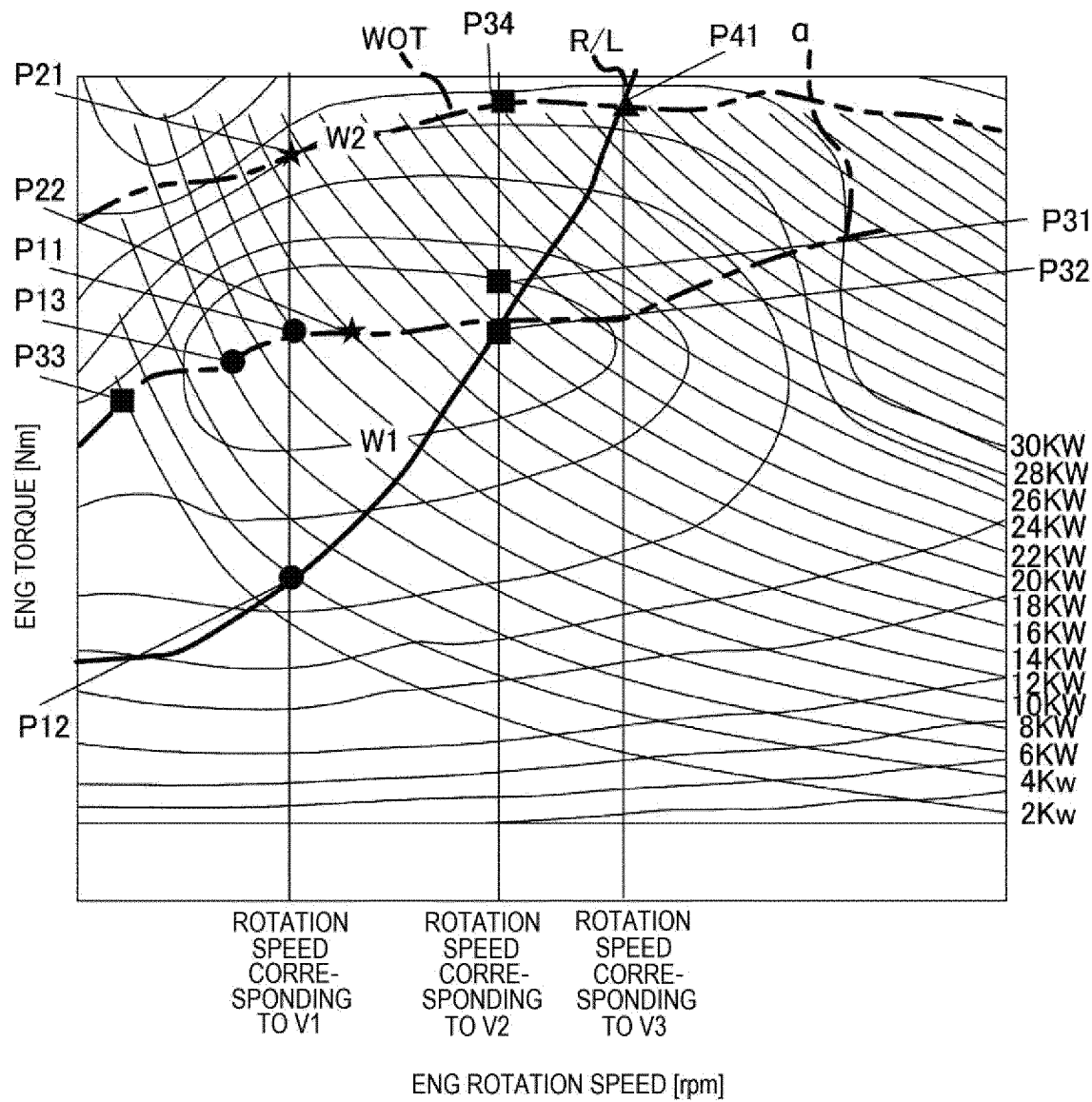
FIG. 6 is a graph illustrating a relation among an operating point, output, and a fuel consumption amount of an engine.

Here, FIG. 6 is a diagram illustrating operating points of the engine 3 in the direct drive mode. In this figure, the rotation speed (rpm) is indicated by a horizontal axis, and corresponds to the vehicle speed (km/h) indicated by the horizontal axis in FIG. 4. An output torque (Nm) of the engine 3 is indicated by a vertical axis, and corresponds to the output (N) indicated by the vertical axis in FIG. 4. In the graph, equal fuel consumption lines each indicating operating points at which fuel consumption rates are equal to each other are illustrated, and a fuel consumption rate (g/kWh) corresponding to the operating point of the engine 3 determined by the vertical axis and the horizontal axis is indicated by the equal fuel consumption line.

A thick solid line, an one-dot chain line, and a two-dot chain line, which are upward to the right, correspond to the R/L line (when the output of the engine 3 is the output required for the constant speed traveling), the $\alpha$ line (when the engine 3 is driven with the optimum fuel consumption), and the WOT line (when the engine 3 is driven at the maximum output) illustrated in FIG. 4, respectively, and indicate sets of operating points in the respective states.

Thin lines downward to the right each indicate output corresponding to the operating point of the engine 3. An intersection point of the right-upward thick line and the right-downward thin line makes it possible to know a change in the output of the engine 3 according to a driving state of the engine 3 (the $\alpha$ line, the WOT line, or the R/L line) determined by the right-upward thick line.

Since the output of the engine 3 indicated by the right-downward thin line is proportional to a product of the torque and the rotation speed of the engine 3, the output increases as the torque increases, and the output increases as the rotation speed increases. When the output is the same (on the same equal fuel consumption line), the rotation speed decreases as the torque increases.

Electric power charged to the battery 5 in the direct drive mode corresponds to the difference between the line (the $\alpha$ line, the WOT line) indicating the operating point of the engine 3 and the line (the R/L line) indicating the output required for traveling. As described above, in the direct drive mode, since the rotation speed of the engine 3 is determined according to the vehicle speed, for example, the chargeable electric power when the engine 3 is driven with the optimum fuel consumption corresponds to the difference between the $\alpha$ line and the R/L line on the vertical axis corresponding to the predetermined speed. The chargeable electric power when the engine 3 is driven at the maximum output corresponds to the difference between the WOT line and the R/L line.

In this figure, in order to mainly describe the determination processing (step S6 in FIG. 5) according to the fuel consumption rate, the engine rotation speeds corresponding to traveling at the vehicle speeds V1 to V3 are indicated along the vertical axis. The vehicle speeds V1 to V3 are also illustrated in FIG. 4.

As an example, charging electric power when the engine 3 operates with the optimum fuel consumption will be examined. As indicated by "circle" marks, when the engine 3 operates with the optimum fuel consumption in the direct drive mode during traveling at the vehicle speed V1, a difference (8 kW) between output (about 12 kW) corresponding to an operating point P11 on the $\alpha$ line and output (4 kW) corresponding to an operating point P12 on the R/L line indicates charging electric power to the battery 5. A fuel consumption rate in this case is determined by an equal fuel consumption line, and the operating point P11 is inside a W1 line, and thus it can be understood that a fuel consumption rate of the operating point P1 is smaller than a value corresponding to W1.

On the other hand, in the series mode, the engine 3 is not connected to the driving wheels 6, and thus the engine 3 can be operated at any rotation speed regardless of the vehicle speed. When any operating point on the $\alpha$ line at which the engine can operate with the optimum fuel consumption is examined, an operating point P13 for obtaining electric power (8 kW) that can be generated in the direct drive mode is determined. A fuel consumption rate in this case is smaller than the value corresponding to W1, as in the case of the operating point P1.

In order to obtain generated electric power of 8 kW, the fuel consumption rates in both the direct drive mode (P11) and the series mode (P13) are less than the value corresponding to W1, but the direct drive mode (P11) is more inside the equal fuel consumption line of W1 than the series mode (P13), and the fuel consumption rate is small (the operation efficiency is high). Therefore, when the required charging electric power is 8 kW, the direct drive mode is selected based on the comparison result according to the fuel consumption rate (S6: No), and thereafter, further determination processing (S7) in the direct drive mode is performed.

As another example, charging electric power when the engine 3 operates at the maximum output will be examined. As indicated by "star" marks, in a case in which the engine 3 operates at the maximum output during traveling at the vehicle speed V1 in the direct drive mode, it is possible to generate electric power corresponding to a difference (14 kW) between an operating point P21 (about 18 kW) on the WOT line and the operating point P12 (4 kW) indicated by the "circle" mark on the R/L line. Therefore, maximum chargeable electric power in the direct drive mode during traveling at the vehicle speed V1 is 14 kW. A fuel consumption rate in this case is determined according to the operating point P21, and is a value corresponding to W2.

On the other hand, in order to obtain the same charging electric power in the series mode, since any operating point on the $\alpha$ line which indicates the optimum fuel consumption is examined, it is necessary to drive the engine 3 at an operating point P22 in order to obtain the generated electric power of 14 kW. Since the operating point P22 is on the line of W1, a fuel consumption rate is smaller than the value corresponding to W1.

Therefore, in order to obtain the generated electric power of 14 kW, the fuel consumption rate in the series mode (P22) is smaller than that in the direct drive mode (P21) (the operation efficiency is high) (S6: Yes), and thus the series mode is selected thereafter (S3).

When the vehicle speed is V1 in the direct drive mode and the required charging electric power exceeds 14 kW, the required charging electric power exceeds the maximum chargeable electric power (14 kW) (S5: Yes), and thus the series mode is selected (S3).

As still another example, a case in which a fuel consumption rate in the series mode is smaller than that in the direct drive mode will be examined. As indicated by "square" marks, in a case in which an electric power generation amount of, for example, 2 kW is required when the vehicle speed is V2, the operating point of the engine 3 is P31. This is because output at the operating point P31 is 22 kW, output at an operating point P32 on the R/L line is 20 kW when the vehicle speed is V2, and an excess of 2 kW of the output at the operating point P31 with respect to the output at the operating point P32 is generated electric power. A fuel consumption rate in this case can be understood from the equal fuel consumption line corresponding to the operating point P31, and is about the value corresponding to W1.

On the other hand, in the series mode, the operating point of the engine 3 for obtaining the charging electric power of 2 kW is an operating point P33 on the α line. A fuel consumption rate in this case is larger than the value corresponding to W1.

Therefore, in order to obtain the generated electric power of 2 kW at the vehicle speed of V2, the fuel consumption rate in the series mode (P13) is larger than that in the direct drive mode (P11) (the operation efficiency is low) (S6: No), and thus further determination processing (S7) in the direct drive mode is performed thereafter.

Chargeable electric power in the case of traveling at the vehicle speed of V2 can be obtained based on a difference (10 kW) between an operating point P34 (30 kW) on the WOT line and the operating point P32 (20 kW) on the R/L line.

As still another example, a case in which chargeable electric power in the direct drive mode is less than zero will be examined. As indicated by a "triangle" mark, when the vehicle speed is V3, the maximum output of the engine 3 (the WOT line) becomes equal to the output required for the constant speed traveling (the R/L line) at an operating point P41. When the vehicle speed exceeds V3, the maximum output of the engine 3 is less than the output required for the constant speed traveling (S7: Yes). This means that, in the direct drive mode, the maximum output of the engine 3 exceeds the output required for maintaining the vehicle speed, and the battery 5 cannot be charged. Therefore, the series mode is selected (S3).

In this way, by using the graph in FIG. 6, other determination processing illustrated in FIG. 5 can be described in addition to the determination processing based on the fuel consumption rate (S6).

As illustrated in FIGS. 4 and 6, the chargeable electric power can be indicated by the difference between the WOT line and the R/L line. As illustrated in the figures, the output indicated by both the WOT line and the R/L line increase as the vehicle speed increases, but an increase rate of the R/L line is larger than that of the WOT line. Therefore, since the chargeable electric power (WOT line-R/L line) decreases as the vehicle speed increases, the chargeable electric power is likely to be less than the required generated electric power (S5: Yes), and the series mode is likely to be selected. This relation will be described with reference to FIGS. 7 and 8.

Figure 7:
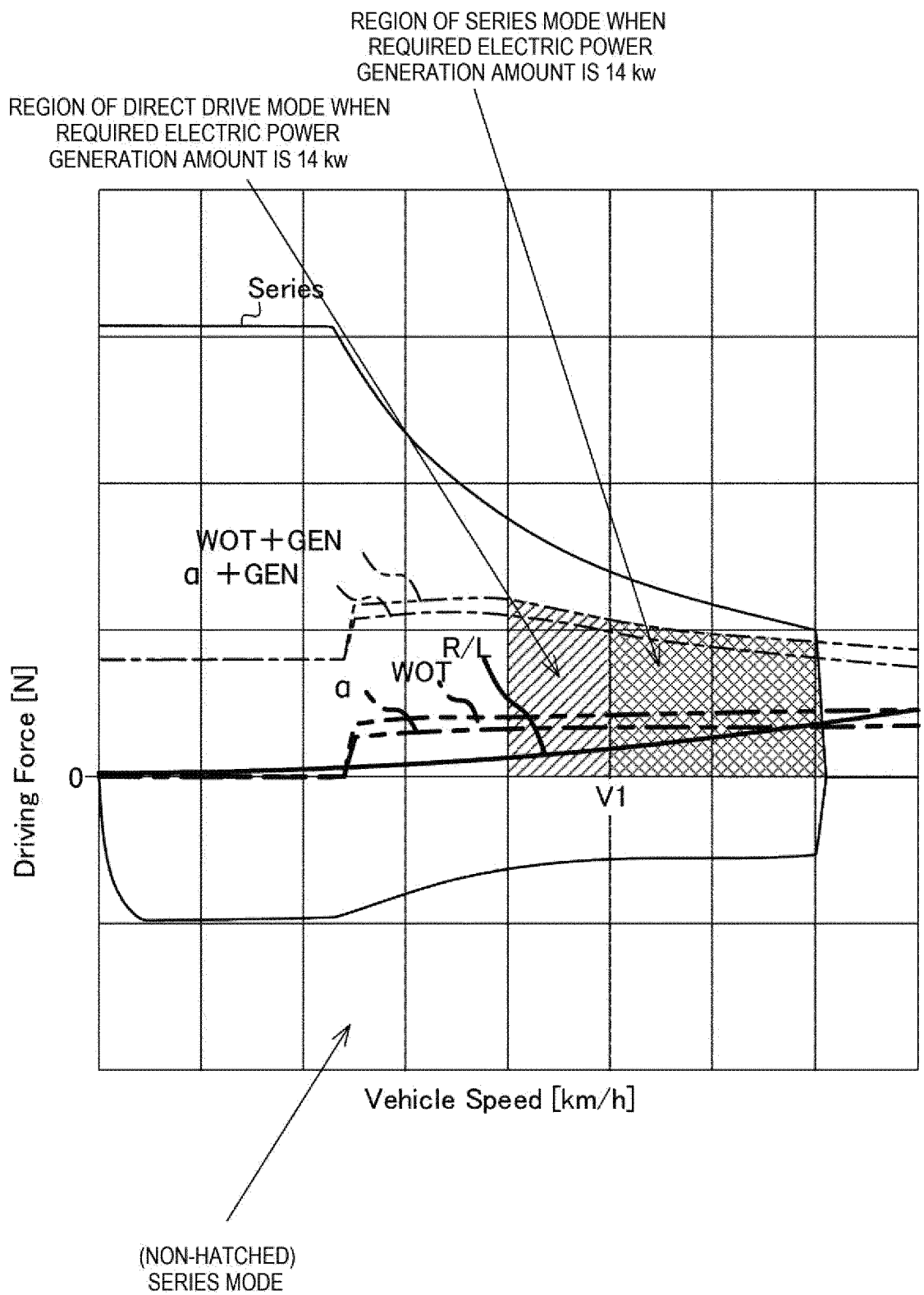
FIG. 7 is a diagram illustrating another operational view.

FIGS. 7 and 8 illustrate operational views similar to that in FIG. 4. In these figures, within the region in which the direct drive mode is selected in principle as illustrated in FIG. 4, in an example in which a required electric power generation amount is a predetermined value, a region in which the required charging electric power exceeds the chargeable electric power at the current vehicle speed (step S5: Yes in FIG. 5), and the series mode (S3) can be selected is hatched in a grid pattern. On the other hand, within the region in which the direct drive mode is selected in principle, a region in which the required charging electric power is less than the chargeable electric power at the current vehicle speed (step S5: No), and charging is possible in the direct drive mode is hatched upward to the right. In regions that are not hatched in these manners, the series mode is selected in principle as in FIG. 4.

FIG. 7 illustrates an example in which the required generated electric power is 14 kW. In a situation of traveling at the vehicle speed of V1, the chargeable electric power is 14 kW, which is equal to the required generated electric power in this example. In detail, the required generated electric power corresponds to the output difference between the operating points P21 and P11 in FIG. 6, and in a situation of traveling at the vehicle speed of V1 when the direct drive mode is selected, the chargeable electric power obtained when the engine 3 is driven at the maximum driving force (the WOT) is 14 kW, which is equal to the required generated electric power. That is, in a region in which the vehicle speed exceeds V1, the chargeable electric power in the direct drive mode is less than the required generated electric power (14 kW), and thus the series mode is selected to implement the required charging electric power. Referring again to FIG. 7, since the chargeable electric power corresponds to the difference between the WOT line and the R/L line, this means that since the chargeable electric power corresponding to the output difference between the WOT line and the R/L line is less than 14 kW, which is the required charging electric power, in the region hatched in a grid pattern in which the vehicle speed exceeds V1, the series mode is selected instead of the direct drive mode.

FIG. 8 illustrates an example in which the required generated electric power is 10 kW. In a situation of traveling at the vehicle speed of V2, the chargeable electric power is 10 kW, which is equal to the required generated electric power in this example. The required generated electric power corresponds to the output difference between the operating points P34 and P31 in FIG. 6, and in a situation of traveling at the vehicle speed of V2 when the direct drive mode is selected, the chargeable electric power obtained when the engine 3 is driven at the maximum driving force (the WOT) is 14 kW, which is equal to the required generated electric power. That is, when the vehicle speed exceeds V2, the chargeable electric power in the direct drive mode is less than the required generated electric power (10 kW), and thus the series mode is selected to implement the required charging electric power. Referring again to FIG. 8, this means that the chargeable electric power corresponding to the output difference between the WOT line and the R/L line is less than 10 kW, which is the required charging electric power, in the region hatched in a grid pattern in which the vehicle speed exceeds V2.

When FIGS. 7 and 8 are compared, a size of the region hatched upward to the right in which the direct drive mode is selected changes in a speed direction according to the required generated electric power. In detail, the region is longer in the speed direction as the required generated electric power is smaller. This is because the output of the engine 3 in the direct drive mode and the output required for the constant speed traveling (the R/L line) both result from the speed, and thus generatable electric power, which is the difference between the output of the engine 3 and the output required for the constant speed traveling, also changes according to the speed.

In detail, the upper limit speed in the region in which the direct drive mode is selected increases as the required generated electric power decreases. This feature is mainly due to two factors. A first factor is that the chargeable electric power easily exceeds the required generated electric power in a state in which the direct drive mode is selected as the required generated electric power decreases. A second factor is that the rate of increase according to the speed in the R/L line is larger than that in the α line, and thus the generatable electric power corresponding to the difference between the R/L line and the α line decreases as the speed increases. Due to these two factors, the chargeable electric power may decrease as the required generated electric power decreases, and thus charging electric power exceeding the required generated electric power can be obtained even at a higher speed, and as a result, the upper limit speed in the direct drive mode increases.

On the other hand, since the lower limit speed of the region in which the direct drive mode is selected is mainly due to the engine 3 and is mainly determined by the design, the lower limit speed does not change according to the required generated electric power. Therefore, the region hatched upward to the right in which the direct drive mode is selected changes in the speed direction according to the required generated electric power, and in detail, the upper limit speed decreases as the required generated electric power increases.

According to the present embodiment, the following effects can be achieved.

According to the method for controlling the hybrid vehicle 1 of the present embodiment, in a state in which the engine 3 is connected to the driving wheels 6 in the direct drive mode, when the battery 5 is charged, quick charging is required, and the required charging electric power per unit time for the battery exceeds the threshold value, the series mode is selected.

Here, since the mode is selected according to a traveling state of the vehicle 1, when the direct drive mode is selected, there is an advantage in the fuel consumption amount or the like over the series mode. However, since the rotation speed of the engine 3 is determined according to the vehicle speed, even if the engine 3 is operated at the maximum output, the battery 5 may not be charged with charging electric power exceeding the required charging electric power per unit time. Therefore, when the required charging electric power exceeds the threshold value, the charging electric power exceeding the required charging electric power per unit time cannot be generated in the direct drive mode, and it is determined that the battery 5 cannot be charged at a required speed, and thus the series mode is selected.

As a result, even when it is necessary to select a charge mode to charge the battery 5, the direct drive mode can be selected if the required charging electric power is less than the threshold value and quick charging is not required. As a result, opportunities to select the direct drive mode appropriately selected according to the traveling state of the vehicle 1 increases, and thus the total fuel consumption amount can be reduced.

According to the method for controlling the hybrid vehicle 1 of the present embodiment, when the battery 5 is charged in the direct drive mode, the controller 7 obtains the chargeable electric power per unit time by subtracting the output required for traveling (the R/L line) from the maximum output of the engine 3 (the WOT line) operating at a rotation speed corresponding to the vehicle speed. When the controller 7 determines that the chargeable electric power is less than the required charging electric power (S5: Yes), the controller 7 disconnects the engine 3 from the driving wheels 6 and causes the vehicle 1 to be driven in the series mode because it is determined that the battery 5 cannot be charged at the required speed.

Here, since the engine 3 is connected to the wheels and the rotation speed is limited, it is necessary to control the generated electric power only by the torque. As a result, since the engine 3 has an upper limit in the generatable electric power (the WOT line), there is also an upper limit in the chargeable electric power obtained by subtracting the output required for traveling from the generatable electric power. When the chargeable electric power is less than the required charging electric power, the battery 5 cannot be charged at the required charging speed in the direct drive mode, and thus the series mode is selected.

Therefore, even if the required charging electric power is large per unit time, the battery can be charged in the direct drive mode unless the required charging electric power exceeds the generatable electric power. As a result, opportunities to select the direct drive mode appropriately selected according to the traveling state of the vehicle 1 increases, and thus the total fuel consumption amount can be reduced.

According to the method for controlling the hybrid vehicle 1 of the present embodiment, further, in a case in which it is assumed that the required generated electric power is implemented, when the fuel consumption in the direct drive mode is less than the fuel consumption in the series mode (S6: Yes), the series mode is selected (S7).

As described above, in the direct drive mode, the fuel consumption rate increases in a case in which the engine 3 operates at the maximum output (the WOT line) due to the connection of the engine 3 to the wheels. On the other hand, in the series mode, since there is no limitation due to the operation state of the vehicle 1, the operating point can be freely selected. Therefore, when the fuel consumption rate in the direct drive mode is smaller than the fuel consumption rate in the series mode (S6: Yes) on the assumption that the required generated electric power is implemented, the series mode is selected (S7), whereby the total fuel consumption amount can be reduced.

According to the method for controlling the hybrid vehicle 1 of the present embodiment, in an operating region (an operational view) determined according to the rotation speed and the torque, a region in which the required charging electric power is less than the chargeable electric power and the charging is possible in the direct drive mode (the regions hatched upward to the right in FIGS. 7 and 8) is narrower in the rotation speed direction as a required charging speed is lower. This is because both the output of the engine 3 and the output required for the constant speed traveling (the R/L line) in the direct drive mode change according to the rotation speed, and thus the generatable electric power, which is the difference between the output of the engine 3 and the output required for the constant speed traveling, also changes according to the rotation speed. Therefore, opportunities to select the series mode decreases as the required charging electric power decreases. This means that opportunities to select the direct drive mode appropriately selected according to the traveling state of the vehicle 1 increases, and thus the total fuel consumption amount can be reduced.

Here, an electric power generation efficiency in the series mode is relatively higher than that in the direct drive mode. Therefore, when the series mode is selected in consideration of the minimization of the fuel consumption amount, the region in which the series mode is selected may be larger and the region in which the direct drive mode is selected may be narrower as the required charging speed (the required charging electric power per unit time) is higher. However, if the series mode is selected in consideration of the electric power generation efficiency, the driving force obtained in the series mode is limited, and thus there is a concern that switching between the series mode and the direct drive mode may occur according to a change in the required driving force.

Therefore, as in the present embodiment, by utilizing a property that the region in which the direct drive mode is selected, that is, the region in which it is determined that the required charging electric power exceeds the chargeable electric power in the case in which the direct drive mode is selected, is narrower according to the required charging electric power, opportunities to appropriately select the direct drive mode can be increased according to the required charging electric power.

As described above, the lower limit speed at which the series mode is selected increases as the required charging electric power decreases, and thus opportunities to select the series mode decreases. This means that opportunities to select the direct drive mode appropriately selected according to the traveling state of the vehicle 1 increases, and thus the total fuel consumption amount can be reduced.

According to the method for controlling the hybrid vehicle 1 of the present embodiment, the controller 7 stops the engine 3 when the charging amount of the battery 5 exceeds the upper limit value (the charging stop threshold value) in a state in which the series mode is selected. This is because it is not necessary to charge the battery 5 anymore when the charging amount of the battery 5 exceeds the threshold value. In this way, the total fuel consumption amount can be reduced.

Although the embodiment of the present invention has been described above, the above-mentioned embodiment is merely a part of application examples of the present invention, and does not mean that the technical scope of the present invention is limited to the specific configurations of the above-mentioned embodiment.

The invention claimed is:

1. A method for controlling a hybrid vehicle, the hybrid vehicle including an engine connected to a generator and configured to be connected to a driving wheel, and a motor configured to be connected to the driving wheel, the motor being driven by electric power supplied from a battery connected to the generator, the method comprising:
    while operating in a direct drive mode in which the engine is connected to the driving wheel, when the battery is charged and a required charging electric power per unit time exceeds a threshold value, switching to a series mode in which the engine drives the generator, by releasing a connection state between the engine and the driving wheel and connecting the motor to the driving wheel, wherein:
    the required charging electric power per unit time is based on a charge request received from a user, and
    the threshold value is a chargeable electric power per unit time obtained by subtracting an output of the engine required for constant speed traveling of the hybrid vehicle from a maximum output of the engine.

2. The method for controlling a hybrid vehicle according to claim 1, further comprising:
    when the required charging electric power per unit time does not exceed the threshold value and a fuel consumption amount of the engine to drive the generator in the series mode at a time of obtaining the required charging electric power per unit time is less than a fuel consumption amount of the engine to drive the driving wheel and the generator in the direct drive mode at the time of obtaining the required charging electric power per unit time, switching to the series mode.

3. The method for controlling a hybrid vehicle according to claim 1, wherein:
    during execution of the method, in a plot of vehicle speed vs. driving force, a region in which the direct drive mode is selected when the required charging electric power per unit time is less than the threshold value, is larger as the required charging electric power per unit time is smaller.

4. The method for controlling a hybrid vehicle according to claim 1, further comprising:
    while operating in the series mode, when a charging amount of the battery exceeds an upper limit value, stopping the engine.

5. A hybrid vehicle comprising:
    an engine connected to a generator and configured to be connected to a driving wheel;
    a motor configured to be connected to the driving wheel, the motor being driven by electric power supplied from a battery connected to the generator; and
    a controller configured to control connection between the engine and the driving wheel, wherein:
    while operating in a direct drive mode in which the engine is connected to the driving wheel, when the battery is charged and a required charging electric power per unit time exceeds a threshold value, the controller switches to a series mode in which the engine drives the generator, by releasing a connection state between the engine and the driving wheel and connecting the motor to the driving wheel,
    the required charging electric power per unit time is based on a charge request received from a user, and
    the threshold value is a chargeable electric power per unit time obtained by subtracting an output of the engine required for constant speed traveling of the hybrid vehicle from a maximum output of the engine.

* * * * *